United States Patent [19]

Call

[11] 4,112,753

[45] Sep. 12, 1978

[54] METEOROLOGICAL MEASURING APPARATUS

[76] Inventor: David B. Call, 2998 Loma Pl., Boulder, Colo. 80301

[21] Appl. No.: 794,936

[22] Filed: May 9, 1977

[51] Int. Cl.$^2$ ............................................. G01W 1/08
[52] U.S. Cl. ................................................... 73/170 R
[58] Field of Search ..................... 73/170 R; 325/113; 340/189 M

[56] References Cited

U.S. PATENT DOCUMENTS

| | | | |
|---|---|---|---|
| 2,717,309 | 9/1955 | Campbell | 325/113 |
| 3,225,593 | 12/1965 | Richard | 73/170 A |
| 3,273,393 | 9/1966 | Spark | 340/189 M |

*Primary Examiner*—Anthony V. Ciarlante
*Attorney, Agent, or Firm*—John E. Reilly

[57] ABSTRACT

A radiosonde is conformable for use either as a disposable sonde in which the device will ascend vertically to a predetermined altitude and when the balloon from which it is suspended bursts at a maximum altitude the sonde will automatically flip over and autogyrate at a reduced rate of descent back to earth; or may be used as a tethered radiosonde in which it is suspended from a tethered balloon in such a way as to be freely rotatable about a substantially horizontal axis. In either version, the sonde is characterized by a generally helicoidal propeller construction having thermistor-receiving end tips and whereby the propellers will impart sufficient spin or rotation to the sonde as to cause the desired degree of aspiration to provide accurate wet bulb psychometric measurements; and further the propeller construction is such as to permit freefall at a reduced controlled rate of speed without the assistance of a parachute.

19 Claims, 13 Drawing Figures

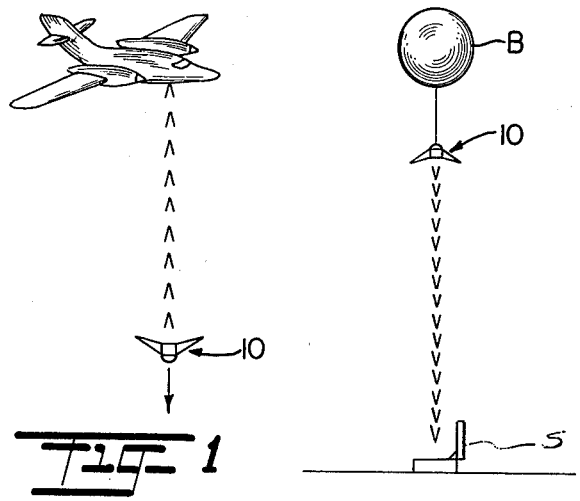
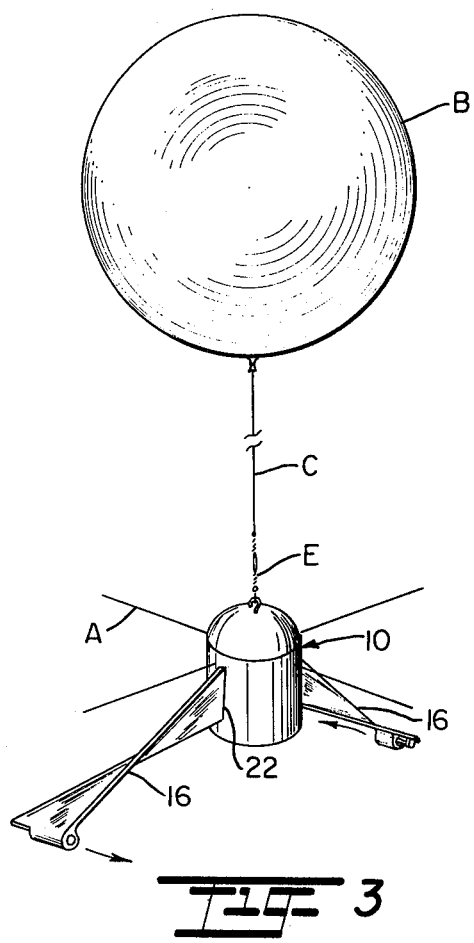
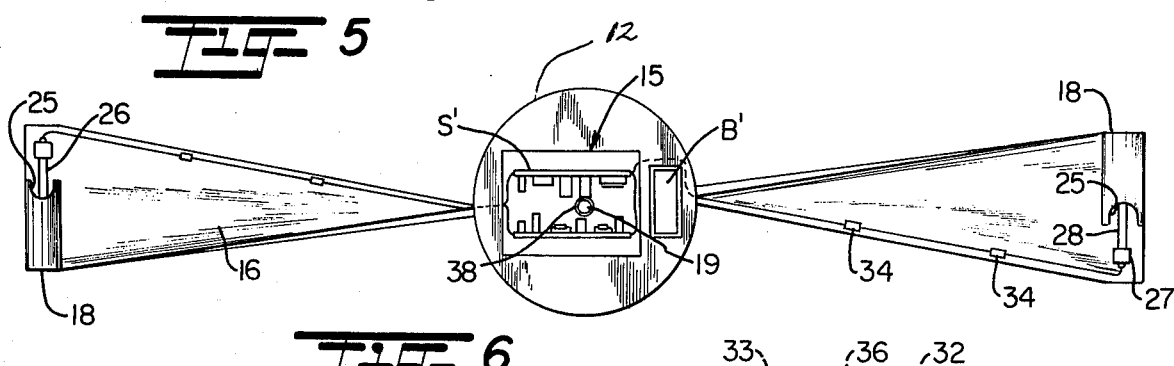
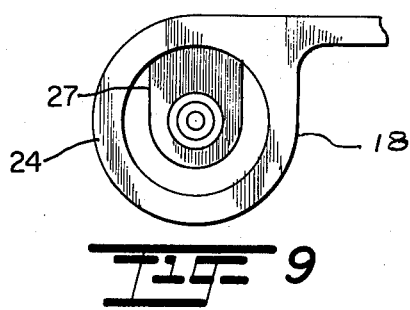
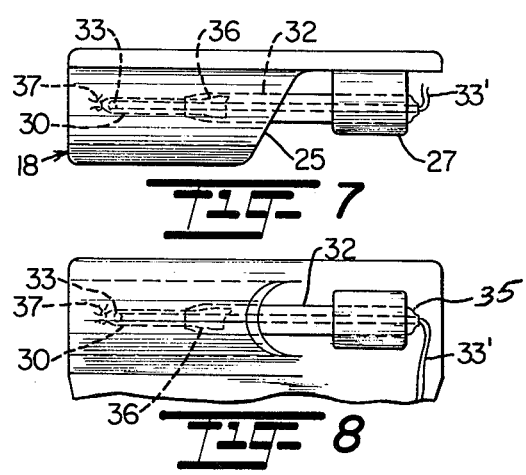

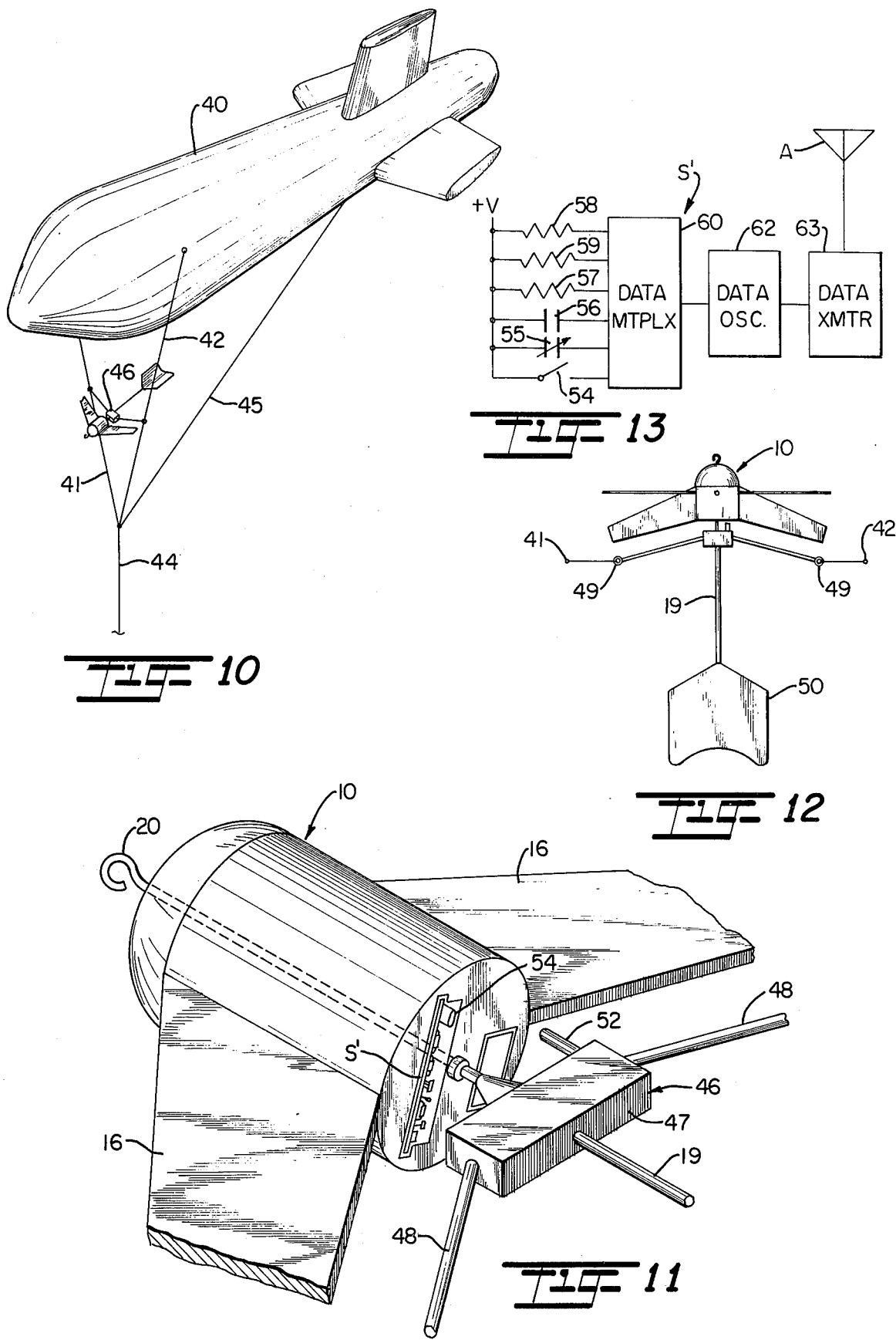

METEOROLOGICAL MEASURING APPARATUS

BACKGROUND OF THE INVENTION

This invention relates to new and useful apparatus for sensing meteorological conditions in the atmosphere and more particularly relates to a radiosonde capable of measuring conditions, such as, temperature, humidity, wind velocity, direction and pressure in a reliable and highly effective manner.

Various types of radiosondes have been devised for measuring conditions in the upper atmosphere. In many cases where it is desired to measure dry and wet bulb temperature conditions, it is customary to employ what may be termed a disposable sonde which can be suspended from a balloon so as to ascend into the upper atmosphere; and when the balloon bursts the sonde will become freefalling and with the assistance of a parachute drop back to earth. Even in those instances where basic measurements of temperature are required, one particular problem has been that of providing the necessary aspiration or airflow over the temperature sensors, since the natural flow of air resulting from ascension is insufficient for accurate psychometric relative humidity measurements. For this reason, means such as mechanical or electrical fans are employed to establish the necessary air movement over the temperature sensor. Reference is made for example to the article entitled "A Small Tethered Balloon Sounding System" which appeared in the September 1975 issue of the American Meteorological Society, pages 964–969 describing the problems and approaches which have been taken in the past to wet and dry bulb temperature measurements.

It has also been proposed to employ some vane members to cause gyration of the sonde in order to increase its stability and here reference is made to U.S. Pat. Nos. 2,717,309 to Campbell and 3,260,940 to Deisinger. Nevertheless it is desirable to provide for a radiosonde which is capable both of providing wet and dry bulb temperature measurement as a result of the natural airflow created by spinning the sonde itself and at the same time to so configure the apparatus as to provide and establish a controlled rate of descent and proper aerodynamic stability of the sonde without the aid of a parachute. In this way the weight and size of the sonde can be materially reduced with more favorable aerodynamic stability than has been previously realized. Moreover it is desirable to provide a sonde of the type described which will readily adapt itself for use in combination with a tethered balloon system in which the sonde can be suspended from the tethered balloon and permit it to spin freely about its main or longitudinal axis. In this relation, the sonde may be supported on a wind-vane supporting frame also free to pivot about the axis of the sonde so as to facilitate wind velocity measurements; or may be used with counter-rotating vanes when suspended from a free balloon to provide a measure of vertical air motion.

SUMMARY OF THE INVENTION

It is therefore an object of the present invention to provide for a novel and improved meteorological sensing apparatus which is conformable for use either as a disposable or tethered device in sensing various atmospheric weather conditions.

It is another object of the present invention to provide for a novel and improved propeller design for a radiosonde which will greatly facilitate wet and dry bulb temperature measurement.

It is a further object of the present invention to provide for a lightweight, frangible meteorological sensing apparatus which is provided with propeller means capable of establishing the necessary aspiration or airflow across wet and dry bulb thermistors solely by virtue of spinning the apparatus either in ascent, descent or when traveling in a generally horizontal path.

It is an additional object of the present invention to provide for a tethered meteorological sensing apparatus in which a wind-vane supporting frame is provided in combination with a radiosonde of the type described to permit accurate measurement of wind velocity and direction.

In accordance with the present invention there has been devised a novel and improved meteorological sensing apparatus which is adaptable for use either as a self-contained or disposable device in which it is suspended from a balloon and will ascend with the balloon to a predetermined altitude until the balloon bursts at which point the device will automatically reverse itself and descend nose downward at a controlled, reduced rate of descent back to earth; or is adaptable for use in combination with a tethered balloon in which the device is suspended from the balloon and freely rotatable about a substantially horizontal axis. In either case, the necessary aspiration is afforded by the manner in which the device is spun about its main axis by a novel and improved propeller design in which the wet and dry bulb thermistors are disposed at or adjacent to the end tips of the propellers and caused to spin at a sufficiently high rate of speed to generate the necessary airflow across the thermistors. Preferably, the propellers are given a generally helicoidal configuration with an angular disposition relative to the body such as to cause the device to autogyrate when the balloon has burst so as to fall at a controlled rate of descent back to earth. Thus by virtue of the propeller construction the use of special fans or other airflow generating means for aspiration of the temperature thermistors is obviated as well as the need for a parachute in reducing the rate of descent of the sonde. Moreover, the configuration of the propellers is such that the end tip may define housings for the termistors which are disposed on axes coincident with the path of rotation of the propellers thereby assuring maximum exposure of the thermistors to airflow thereacross.

When the device of the present invention is suspended from a tethered balloon, most desirably a wind-vane supporting frame is also suspended between the tether lines and free to pivot on a horizontal axis together with the device itself, while the balloon is free to pivot on a vertical axis so as to orient itself into the prevailing wind. In this way, the axis of rotation of the measuring device will be properly aligned for wind velocity measurement together with other conditions to be sensed. Sensing means are provided most desirably on the wind-vane supporting frame to facilitate wind velocity measurement through the meteorological instruments provided in the device.

The conformability of the device of the present invention to various different applications is further exemplified by its use in association with a counter-rotating vane which when flown on a free balloon will permit measurements of vertical air motion. Thus, the speed of rotation of the device with respect to the counter-rotating vane may be a measure of the rate of the balloon and device arising through the air. The difference between ascent rate calculated from pressure sensor information and indicated speed of ascent from rotation may then be a measure of true vertical air motion. The measurement can be made either while ascending on a free balloon or falling after the balloon has burst as hereinbefore described.

Other objects, advantages and features of the present invention will be more readily understood and appreciated from the following description of a preferred form of the present invention when taken along with the accompanying drawings.

BRIEF DESCRIPTION OF THE DRAWINGS

FIG. 1 is a schematic view of the preferred embodiment illustrating its release and descent from an aircraft.

FIG. 2 is a somewhat schematic view illustrating the preferred embodiment of the present invention ascending with a balloon.

FIG. 3 is a somewhat perspective view illustrating disposition of the preferred form of the present invention in suspended relation to a balloon.

FIG. 4 is a top plan view of the preferred form of the present invention.

FIG. 5 is a front elevational view thereof.

FIG. 6 is an enlarged bottom plan view of the preferred form of the present invention.

FIG. 7 is an enlarged fragmentary view illustrating disposition of a thermistor in one end tip of the preferred form of the present invention.

FIG. 8 is a bottom plan view of the mounting of the thermistor as shown in FIG. 7.

FIG. 9 is an end view of the end tip and thermistor mounting shown in FIGS. 7 and 8.

FIG. 10 is a somewhat schematic view illustrating suspension of the preferred form of the present invention from a tethered balloon.

FIG. 11 is a perspective view in detail of the manner of suspension of the preferred form on a wind-vane supporting frame.

FIG. 12 is a plan view of the preferred form of the present invention on a wind-vane supporting frame as shown in FIG. 11; and FIG. 13 is a somewhat schematic view of a typical form of sensing circuit employed in the preferred embodiment of the present invention.

DETAILED DESCRIPTION OF THE PREFERRED EMBODIMENT

Referring in detail to the drawings, there is shown in FIGS. 1 to 9 a meteorological sensing apparatus 10 which is broadly comprised of a generally cylindrical, central body or casing 12 having a rounded nose portion 14, and various meteorological instruments generally designated at 15 are mounted within the body. Propeller means in the form of generally helicoidal vanes 16 radiate from the external surface of the body 12 at equally spaced circumferential intervals and terminate in thermistor-receiving end tips 18. As a setting for the present invention, in the form shown in FIGS. 1 to 9, it is adapted to sense meteorological conditions in the upper atmosphere and to this end may be suspended by a suitable cord or cable designated at C from a balloon B and having a swivel connection E, as shown in FIG. 3. The balloon B is of the type conventionally employed to rise into the upper atmosphere and at a given altitude burst so as to permit descent of the sensing apparatus suspended therefrom. As represented in FIG. 2, a ground station S contains the necessary instrumentation to receive signals from the meteorological instruments in the sensing apparatus including pressure, temperature, wet bulb temperature, and in certain cases wind speed and wind direction, all of which data is transmitted to the surface in a time multiplex format in a conventional manner.

As further represented in FIG. 1, the sensing apparatus 10 may be dropped from an aircraft; or if it is permitted to descend once the balloon has burst, it will automatically reverse itself, or flip over, by virtue of its center of gravity and will descend at a reduced rate governed by the particular air foil configuration and angular disposition of the propeller means without the assistance of a parachute. In the setting as described, the propeller means is therefore capable of spinning the sensing apparatus as it ascends with a balloon so as to cause the thermistors located in the end tips of the propeller means to rotate at a sufficiently high rate of speed to generate the necessary relative air velocity or aspiration for accurate wet and dry bulb temperature measurements. Conversely, once the balloon has burst or the sensing apparatus is otherwise permitted to descend as shown with reference to FIG. 1, the nose of the casing will be in leading relation to the propeller means, the propeller means causing the apparatus to autogyrate and to descend at a controlled, reduced rate of speed so as not to present any danger to objects or personnel on the ground when the apparatus falls back to earth.

Considering in more detail the construction and arrangement of the preferred form of the present invention, the central body or casing 12 is most desirably of generally tubular configuration so as to form a hollow cylindrical thin-walled casing for the meteorological instruments which for the purpose of example may consist of a radio transmitter, not shown, sensing circuitry S' and a battery pack B'. One end of the casing is closed by the rounded nose or cap 14 except for a central bore which is adapted to receive a slender elongated axle 19 having an eye or hook 20 at its leading end. A bearing 38 at the trailing end of the body supports the axle within the body while permitting the body to rotate freely with respect to the axle 19 for attachment of the cable C or other suitable suspension means.

An important feature of the present invention resides in the propeller means 16 which as indicated earlier each takes the form of a vane or blade of generally helicoidal configuration. As shown in FIGS. 2 and 3, there are two propeller means 16 located 180° apart about the longitudinal axis of the central body 12. These propellers also make an angle of approximately 60°–70° with that longitudinal axis as generally shown in FIGS. 3 and 5. Each vane is generated from a thin, flat elongated section which is twisted about its major length so that the connecting end 22 is disposed for connection to the external surface of the casing on a line almost parallel to the longitudinal axis of the casing, but the end tip 18 is disposed substantially at 90 degrees thereto and offset rearwardly or downwardly of the body with its axis disposed coincident with the generally spiral path of rotation of the propeller means and substantially normal to the longitudinal axis of the casing. Specifically, however in establishing a propeller of helicoidal configuration in accordance with the preferred form of invention, the resultant wind velocity vector would be parallel to the vane at any point along the vane surface. As a result, the end tips 18 are in practice tilted somewhat away from horizontal so that the leasing end of the tip is slightly above the trailing end.

As illustrated in more detail in FIGS. 5 to 9, each of the end tips 18 is in the form of a cylindrical sleeve 24 which traverses the greater width of the end tip and terminates in a somewhat recessed trailing end surface 25. Disposed within each sleeve is a thermistor, there being a dry bulb thermistor assembly 26 which is suspended in the sleeve by a bracket 27 mounted on the end tip just rearwardly of the sleeve so that the thermistor projects forwardly and centrally through the sleeve. In turn, a wet bulb thermistor assembly represented at 28 is disposed in the opposite sleeve and mounted by means of a corresponding bracket 27 in the sleeve. The thermistor assemblies 26 and 28 are comprised of corresponding elements, with one exception to be referred to, and accordingly only the wet bulb thermistor assembly 28 is shown in detail in FIGS. 7 to 9. Thus, as shown, a relatively small diameter tube 30 at the leading end expands into an enlarged tubular section 32 continuing rearwardly from the smaller tube and being reduced or necked down at its trailing end 35. A conventional temperature-sensing thermistor 33 is spaced forwardly of the leading end of the tube portion 30 with thermistor lead wires 33' leading through the tubular sections 30 and 32 then along the trailing edge of the vane 16 by suitable fasteners represented at 34 and directed into the sensing circuit S'. In the dry bulb thermistor assembly, most desirably the thermistor 33 is supported at the end of a slender tube, not shown, which extends in inner concentric relation to the tube 30 and through which the lead wires 33' extend. In addition, in the wet bulb thermistor assembly the enlarged tube section 32 forms a reservoir for water, and a wick 36 which extends through the forward end of the larger tube 32 and through the tube 30 is fastened around the outside of the leading end of the tube 30 by a cotton thread tie 37. The section 32 can be filled with water by injecting the water under pressure such as by means of a syringe through the trailing end 35.

In ascent, the propellers 16 will cause the apparatus to spin on its vertical axis which rotation will produce a high relative air velocity at the tips sufficient to establish the necesssary psychometric relative humidity measurement of dry bulb versus wet bulb temperature. The temperature sensing elements may through the sensing circuit to be hereinafter described be such as to provide a temperature indication in relation to resistance changes. For instance the humidity responsive element on the wet bulb thermistor will be such that the rate of evaporation of the moisture on its surface will vary the resistance sensed. Once the apparatus 10 reaches its peak of ascent, or in other words, the balloon has reached its maximum altitude and bursts, the center of gravity of the apparatus is such as to tip the apparatus over and cause the nose to continue to be in leading relation to the propeller means in its descent. The propeller means once again will rotate at an even higher rate of speed and the helicoidal configuration of the propeller surfaces will reduce the rate of descent to a speed on the order of 4 to 6 meters per second. For the purpose of illustration and not limitation, the preferred form of body 12 as well as the propellers 16 are composed of styrofoam, the body being on the order of 3 inches in diameter and the propellers being on the order of 7 inches in length and 2½ inches in width. With the transmitter sensing circuit and battery in place the entire weight of the apparatus is approximately 4 ounces.

In a device as described, the rate of rotation in ascent is approximately 4 to 6 revolutions per second and in descent would increase to 12 to 15 revolutions per second.

DESCRIPTION OF MODIFIED FORM

A modified form of meteorological sensing system is illustrated in FIGS. 10 to 12 wherein the sensing apparatus 10 is suspended from a tethered balloon represented at 40 by front suspension wires 41 and 42 which converge downwardly into a common tether line 44 so as to define a generally Y-shaped front suspension system. Still another suspension line 45 may extend from the tail of the balloon 40 into the common point of connection of the suspension wires 41 and 42. Apparatus 10 is suspended between the front lines 41 and 42 by a common support frame 46 which includes a central mounting block 47 journaled on the main axle 19 and having support rods 48 extending from opposite sides of the block 47 for connection by swivel connectors 49 to the suspension wires 41 and 42. A wind vane 50 of generally flat, arrow-shaped configuration is affixed to the rearward end of the axle 19, the purpose of the wind vane being to insure that the axis of rotation of the sensing apparatus 10 will remain substantially horizontal notwithstanding changes in balloon or tether line orientation. Since the apparatus is free to rotate with its axle 19 under the influence of the propeller means 16, it will be under constant rotation both with respect to the balloon and the supporting block 47. Thus measurement of wind velocity may be made by mounting of a bar magnet 52 on the front surface of the supporting block which will pass in confronting relation to a reed switch 54 during each complete revolution of the apparatus. Each time that the magnet passes the reed switch it will cause it to advance to a closed position, then return to an open position in moving away from the switch and in this way the frequency of reed switch closure may be a measure of the wind speed. This information together with the other information sensed may be transmitted to ground to provide necessary readings of atmospheric conditions.

As schematically shown in FIG. 13, the sensing circuit 3' at the trailing end of the body 12 includes together with the reed switch, a variable capacitor represented at 55 for use in pressure measurements, a reference capacitor represented at 56, a reference resistor 57 and resistors 58 and 59 for dry bulb and wet bulb measurement, respectively. The resistance and capacitive elements together with the reed switch are connected in parallel into a data multiplexer represented at 60 which in turn is directed into a data oscillator 62 and transmitter 63 from which signals are directed into the antenna A for transmission to ground. The circuitry as described is merely representative of various types of circuitry employed for the purpose of sensing and measuring atmospheric or meteorological conditions and are thus given merely for the purpose of illustration.

The versatility of the sensing apparatus 10 makes it readily conformable for various applications for measuring meteorological conditions other than the specific applications described. It is therefore to be understood that various modifications and changes may be made in the construction and arrangement of the preferred embodiment of the present invention as well as its mounting and disposition with respect to other apparatus without departing from the spirit and scope of the present invention.

What is claimed is:

1. Apparatus for sensing meteorological conditions in the atmosphere comprising:
   a central body of aerodynamic configuration containing meteorological instruments and including means for transmitting signals of conditions sensed by said meteorological instruments;
   propeller means disposed at circumferentially spaced intervals on said body, each of said propeller means inclining rearwardly away from said body and terminating in a tip end, said propeller means being operative to spin said apparatus about the central axis of said body; and
   at least one temperature-sensing element disposed on at least one of said propeller means at a point spaced radially outwardly of the outer periphery of said body.

2. Apparatus according to claim 1, each propeller means terminating in a generally sleeve-like end tip, and a temperature-sensing thermistor located in at least selected of said end tips of said propeller means.

3. Apparatus according to claim 1, said propeller means being of generally helicoidal configuration with said end tips each disposed on an axis extending coincident with the path of rotation of said end tips.

4. Apparatus according to claim 1, said body and said propeller means being of lightweight, frangible construction, each of said propeller means being in the form of a twisted blade of generally helicoidal configuration.

5. Apparatus according to claim 4, the angle of inclination of each of said propeller means away from said body being on the order of 60°–70°.

6. Apparatus according to claim 1, said propeller means each being of generally helicoidal configuration and inclining rearwardly from the outer periphery of said body at equally spaced circumferential intervals.

7. Apparatus according to claim 1, there being a pair of propeller means extending from diametrically opposed locations on said body and each terminating in a generally cylindrical, thermistor-receiving sleeve at its end tip, there being a dry bulb thermistor disposed in one end tip and a web bulb thermistor disposed in the opposite end tip, the axis of each sleeve being coincident with the path of rotation of said propeller means.

8. Apparatus in accordance with claim 1, the center of gravity of said apparatus being located toward the nose end of said body whereby said propeller means is operative to autogyrate and retard the velocity of descent of said apparatus without the aid of a parachute.

9. Apparatus in accordance with claim 8, said propeller means each being of helicoidal configuration and each defined by a vane having its end tip at an acute angle to the horizontal and with the leading end of the end tip raised slightly above the trailing end.

10. Apparatus for sensing meteorological conditions in the atmosphere comprising:
    a central body of aerodynamic configuration containing meteorological instruments and including means for transmitting signals of conditions sensed by said meteorological instruments;
    propeller means of generally helicoidal configuration at circumferentially spaced intervals around the periphery of said body, each of said propeller means terminating in a tip end, said propeller means being operative to spin said apparatus about the central axis of said body; and
    a temperature-sensing thermistor disposed at the tip end of each said propeller means at a point spaced radially outwardly of the outer periphery of said body.

11. Apparatus according to claim 10, each propeller means terminating in a generally sleeve-like thermistor-receiving end tip, and one of said thermistors defined by a wet-bulb thermistor including a wick and a source of water for said wick.

12. Apparatus according to claim 11, the end tips of said propeller means each being in the form of a generally cylindrical sleeve disposed on an axis extending coincident with the path of rotation of said end tips.

13. Apparatus according to claim 10, each of said propeller means inclining rearwardly to terminate in an end tip spaced rearwardly of said body.

14. Apparatus according to claim 10, there being a pair of propeller means extending from diametrically opposed points on said body and each terminating in a generally cylindrical, thermistor-receiving sleeve at its end tip, there being a dry bulb thermistor disposed in one end tip and a wet bulb thermistor disposed in the opposite end tip, and the center of gravity of said apparatus being located adjacent to the nose end of said body whereby said propeller means are operative to autogyrate and retard the velocity of descent of said apparatus.

15. Apparatus for sensing meteorological conditions in the atmosphere wherein an airborne craft is provided with spaced tether lines adapted for suspension of said apparatus therefrom, said apparatus comprising:
    a sonde having a central body adapted to contain meteorological instruments, propeller members disposed at spaced circumferential intervals about said body for outward radial extension therefrom, and at least one temperature-sensing thermistor disposed on one of said propeller members, and sensing means disposed on said body;
    a supporting frame member including horizontally extending center support means journaled in said frame member adapted to suspend said sonde from said tether lines; and
    wind vane means mounted on said center support means in spaced relation to said sonde and operative to rotate in response to passage of air thereacross whereby to actuate said sensing means in response to rotation of said wind vane means.

16. Apparatus according to claim 15, said sensing means disposed at the trailing end of said sonde in confronting relation to said support frame, and said wind vane means disposed on said center support means in rearwardly spaced relation to the trailing end of said sonde.

17. Apparatus according to claim 16, said wind vane means affixed to one end of said center support means and cooperative with said propeller members to rotate said sonde in advancing said sensing means with respect to said support frame member, said support frame member including an actuator element for said sensing means adapted to actuate said sensing means for each revolution of said wind vane means.

18. Apparatus according to claim 17 wherein said sensing means is defined by a reed switch member, and said actuating element on said support frame member is defined by a magnet.

19. Apparatus according to claim 15, each of said propeller members terminating in outer end tips, there being a pair of propeller members disposed in diametrically opposed relation to one another, a dry bulb temperature-sensing thermistor located in one end tip and a wet bulb temperature-sensing thermistor located in the other end tip.

* * * * *